(12) United States Patent
Jerger et al.

(10) Patent No.: US 9,488,266 B2
(45) Date of Patent: *Nov. 8, 2016

(54) METHOD FOR CONTROLLING A TRANSMISSION OF A MOTOR VEHICLE

(71) Applicant: Jaguar Land Rover Limited, Coventry (GB)

(72) Inventors: Rob Jerger, Southham (GB); Pete Stares, Coventry (GB); Hardev Mandair, Birmingham (GB)

(73) Assignee: Jaquar Land Rover Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/533,805

(22) Filed: Nov. 5, 2014

(65) Prior Publication Data

US 2015/0053039 A1     Feb. 26, 2015

Related U.S. Application Data

(63) Continuation of application No. 13/937,405, filed on Jul. 9, 2013, now Pat. No. 8,909,444, which is a continuation of application No. 12/990,424, filed as application No. PCT/IB2009/051777 on Apr. 30, 2009, now Pat. No. 8,504,266.

(30) Foreign Application Priority Data

May 1, 2008 (GB) .................................. 0807914.7

(51) Int. Cl.
| F16H 59/10 | (2006.01) |
| F16H 61/18 | (2006.01) |
| F16H 61/24 | (2006.01) |

(52) U.S. Cl.
CPC ............. *F16H 59/105* (2013.01); *F16H 61/24* (2013.01); *Y10T 74/2003* (2015.01); *Y10T 74/2014* (2015.01)

(58) Field of Classification Search
CPC . F16H 59/105; F16H 61/24; Y10T 74/2003; Y10T 74/2014
See application file for complete search history.

(56) References Cited

U.S. PATENT DOCUMENTS

| 5,420,565 A | 5/1995 | Holbrook |
| 7,603,924 B2 | 10/2009 | Mandou et al. |
| 2009/0049943 A1 | 2/2009 | Horneffer et al. |

FOREIGN PATENT DOCUMENTS

| EP | 2028395 A1 | 2/2009 |
| JP | 2004251436 A | 9/2004 |

OTHER PUBLICATIONS

International Search Report for PCT/IB2009/051777, dated Nov. 19, 2009.
English Abstract for JP 2004-251436A.
Office Action for JP Application No. 2014-133869, mailed May 7, 2015, 3 pp.

*Primary Examiner* — Michael J Zanelli
(74) *Attorney, Agent, or Firm* — Fishamn Stewart PLLC (57) ABSTRACT

A method for controlling a motor vehicle transmission (11) is disclosed in which a sensor (18) used to produce an indication of position of a selector (17) is calibrated such that positioning the selector (17) at a peak force feedback position produced by a peak and trough force feedback mechanism (24) connected to the selector (17) will always result in the selection of a drive mode of the transmission (11).

19 Claims, 8 Drawing Sheets

METHOD FOR CONTROLLING A TRANSMISSION OF A MOTOR VEHICLE

CROSS-REFERENCES TO RELATED APPLICATION

This application is a continuation of U.S. patent application Ser. No. 13/937,405, filed on Jul. 9, 2013. U.S. patent application Ser. No. 13/937,405 is a continuation of U.S. patent application Ser. No. 12/990,424 (U.S. Pat. No. 8,504,266), filed on Apr. 30, 2009. U.S. patent application Ser. No. 12/990,424 claims priority to International Patent Application PCT/IB2009/051777 filed on Apr. 30, 2009, which claims priority to United Kingdom Patent Application GB 0807914.7, filed on May 1, 2008. All of these references are both hereby incorporated by reference in their entirety.

The present invention relates to a method for controlling a transmission for a motor vehicle and in particular to a method for controlling the operation of multi-stable shift-by wire selector control system of an automatic or semi-automatic vehicle transmission.

It is known from, for example, GB-A-2420833 to provide a shift-by-wire selector having multi-stable positions, each operating a mode of the automatic transmission, i.e. Park, Reverse, Neutral, Drive. The selector includes sensor means for sensing the position of the selector and generating selector signals to a transmission control unit which transmits control signal to the vehicle transmission and an indexing mechanism for maintaining the selector in each of its multi-stable positions. The indexing means has a detent plate having notches for cooperation with a mechanical detent having a configurable force.

Although such a selector has been proven effective, it has been found that it is possible for the selector to be left between two positions, e.g. between a Park position and/or a Neutral position. When this happens, the selector might be able to be moved by a subsequent vibration, shock or even unintentionally by a person and engaged a drive mode (Drive, Reverse) of the automatic transmission even if the selector is left in Park position as the selector cannot be locked by a lock mechanism which can only be engaged when the selector is in a nominal Park position or Neutral position and thus might cause an unsafe vehicle condition.

It is an object of the present invention to provide an improved control system which overcomes or alleviates the above problem.

According to a first aspect of the invention there is provided a method for controlling a transmission of a motor vehicle having a number of operating modes including at least one non-drive mode and at least one drive mode and a multi-stable selector for operation by a driver of the vehicle to select a respective one of the operating modes of the transmission, the multi-stable selector including a mechanism providing a number of stable positions corresponding to the operating modes and a peak and trough force feedback to the driver so as to enable the driver to perceive the transition from one stable position to another and at least one sensor to sense the position of the selector and supply a signal to an electronic controller indicative of a required operating mode wherein the method comprises calibrating the output from the at least one sensor such that, when the selector is located at any one of the peak force feedback positions, the signal from the at least one sensor always results in the selection by the electronic controller of a drive mode.

The transmission may have two non-drive modes in the form of a park mode and a Neutral mode and two drive modes in the form of a reverse mode and a forward mode.

The multi-stable selector may be operable to reversibly select the operating modes in the sequence park, reverse, neutral and drive.

The transmission may further comprise a third drive mode in the form of a sport mode. In which case, the multi-stable selector is operable to reversibly select the operating modes in the sequence park, reverse, neutral, drive and sport.

The electronic controller may comprise an electronic transmission selector operably connected to a transmission control unit, the electronic transmission selector may be arranged to receive the signal from the at least one sensor and command the transmission control unit to select a desired operating mode.

The method may further comprise dividing the output range of the at least one sensor into a number of bands having upper and lower limits corresponding to the various operating modes and calibrating the output from the at least one sensor further comprises arranging the bands such that, when the selector is located at any one of the peak force feedback positions, the magnitude of signal output from the at least one sensor falls within one of the drive mode bands.

The upper and lower limits of each band may be higher when the selector is moved in one direction than they are when the selector is moved in an opposite direction.

The upper and lower limits may be higher when the selector is moved from one of park to reverse, reverse to neutral and neutral to drive than they are when the selector is moved from one of drive to neutral, neutral to reverse and reverse to park.

The upper and lower limits may be higher when the selector is moved from one of park to reverse, reverse to neutral, neutral to drive and drive to sport than they are when the selector is moved from one of sport to drive, drive to neutral, neutral to reverse and reverse to park.

According to a second aspect of the invention there is provided an apparatus for controlling a motor vehicle transmission having a number of operating modes including at least one non-drive mode and at least one drive mode, the apparatus comprising a multi-stable selector for operation by a driver of the vehicle to select a respective one of the operating modes of the transmission, at least one sensor for sensing the position of the selector and an electronic controller to receive an output signal from the at least one sensor and select an operating mode of the transmission based upon the received signal wherein the multi-stable selector includes a mechanism providing a number of stable positions corresponding to the operating modes and a peak and trough force feedback to the driver so as to enable the driver to perceive the transition from one stable position to another and the electronic controller is operable to receive the output from the at least one sensor and calibrate the sensor output such that, when the selector is located at any one of the peak force feedback positions, a drive mode of the transmission is always selected.

The transmission may have two non-drive modes in the form of a park mode and a Neutral mode and two drive modes in the form of a reverse mode and a forward mode.

The multi-stable selector may be operable to reversibly select the operating modes in the sequence park, reverse, neutral and drive.

The transmission may further comprise a third drive mode in the form of a sport mode. In which case, the multi-stable selector may be operable to reversibly select the operating modes in the sequence park, reverse, neutral, drive and sport.

The electronic controller may be further operable to divide the output range of the at least one sensor into a number of bands having upper and lower limits corresponding to the various operating modes and arrange the bands such that, when the selector is located at any one of the peak force feedback positions, the magnitude of signal output from the at least one sensor falls within one of the drive mode bands.

The upper and lower limits of each band may be higher when the selector is moved in one direction than they are when the selector is moved in an opposite direction.

The upper and lower limits may be higher when the selector is moved from one of park to reverse, reverse to neutral and neutral to drive than they are when the selector is moved from one of drive to neutral, neutral to reverse and reverse to park.

The upper and lower limits may be higher when the selector is moved from one of park to reverse, reverse to neutral, neutral to drive and drive to sport than they are when the selector is moved from one of sport to drive, drive to neutral, neutral to reverse and reverse to park.

The electronic controller may comprise an electronic transmission selector operably connected to a transmission control unit and the electronic transmission selector may be operable to receive the output from the at least one sensor and calibrate the sensor output such that, when the selector is located at any one of the peak force feedback positions, the electronic transmission selector is arranged to command the transmission control unit to select a drive operating mode.

The electronic transmission selector may be further operable to divide the output range of the at least one sensor into a number of bands having upper and lower limits corresponding to the various operating modes and arrange the bands such that, when the selector is located at any one of the peak force feedback positions, the magnitude of signal output from the at least one sensor falls within one of the drive mode bands.

The upper and lower limits of each band may be higher when the selector is moved in one direction than they are when the selector is moved in an opposite direction.

The upper and lower limits may be higher when the selector is moved from one of park to reverse, reverse to neutral and neutral to drive than they are when the selector is moved from one of drive to neutral, neutral to reverse and reverse to park.

The upper and lower limits may be higher when the selector is moved from one of park to reverse, reverse to neutral, neutral to drive and drive to sport than they are when the selector is moved from one of sport to drive, drive to neutral, neutral to reverse and reverse to park.

According to a third aspect of the invention there is provided a motor vehicle having an apparatus for controlling a motor vehicle transmission having a number of operating modes including at least one non-drive mode and at least one drive mode constructed in accordance with said second aspect of the invention.

The invention will now be described by way of example with reference to the accompanying drawings of which.

With reference to FIGS. 1 to 4 there is shown an electrical architecture of a motor vehicle 1 including an engine 10, an automatic gearbox or transmission 11 and a multi-stable selector system 12.

Figure 1:
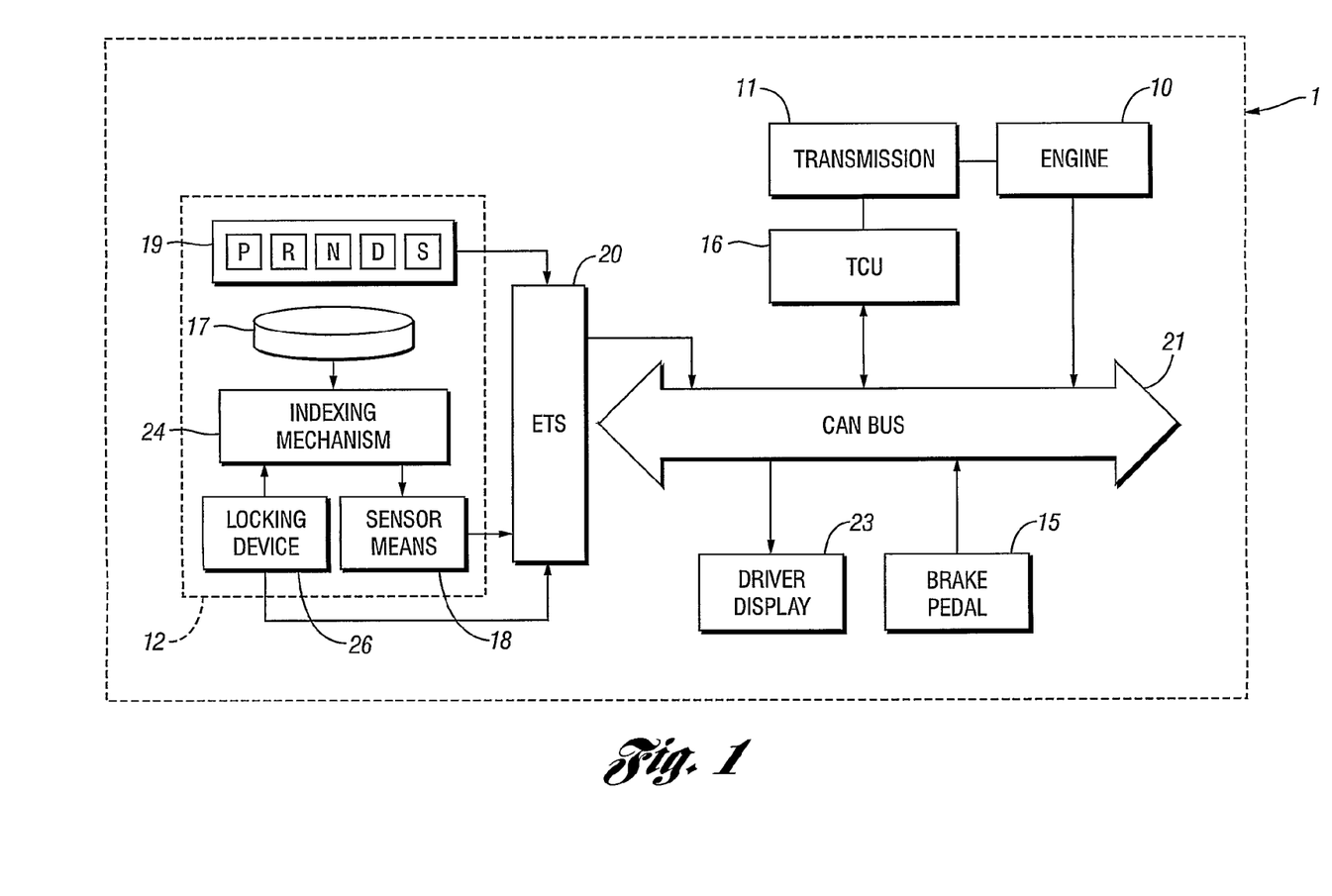
FIG. 1 is a schematic representation of the principal electrical subsystems of a motor vehicle provided with a multi-stable shift-by-wire control selector system in accordance with the present invention.

The transmission 11 is controlled by a transmission control unit (TCU) 16 which includes sensors arranged to detect the position of the transmission. The TCU 16 is electrically connected by a CAN 21 and a backup CAN 22 to an Electronic Transmission Selector (ETS) 20 which is electrically connected to the selector system 12. The CAN 21 is used to interconnect the electronic sub-systems of the vehicle 1 together so that they can communicate as required with one another.

The selector system 12 is provided in the passenger compartment for enabling the selection of operating modes in the transmission, e.g. Park (P), Reverse (R), Neutral (N), Drive (D) and Sport (S).

Figure 2:
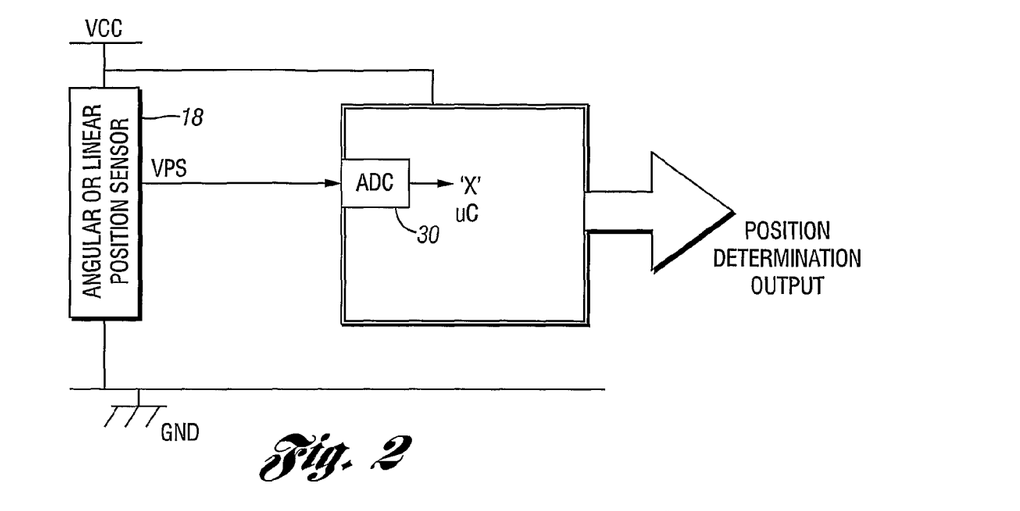
FIG. 2 is a schematic representation of the means used to process the output from a sensor means used to sense the position of a gear selector.
Figure 3:
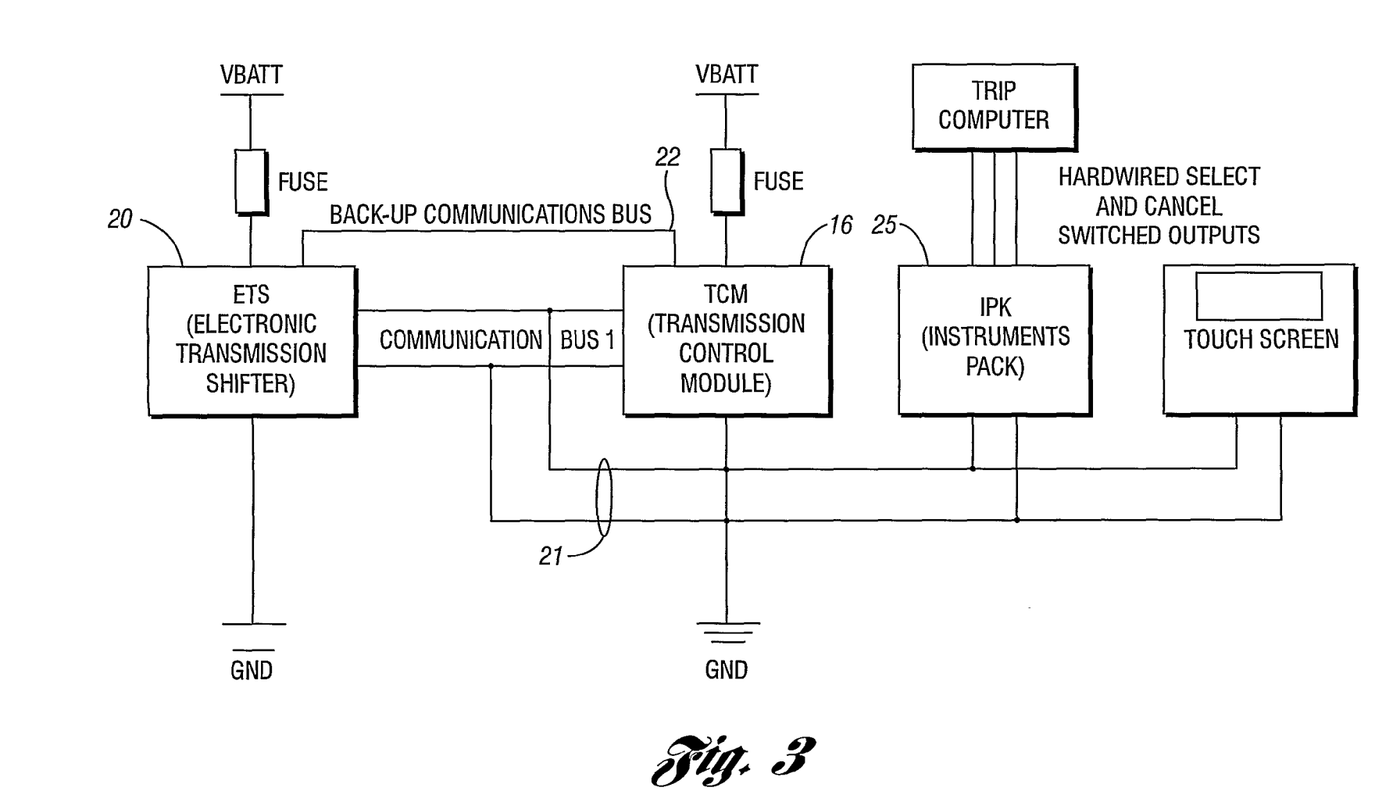
FIG. 3 is a schematic diagram showing further detail of the selector system shown in FIG. 1.
Figure 4A:
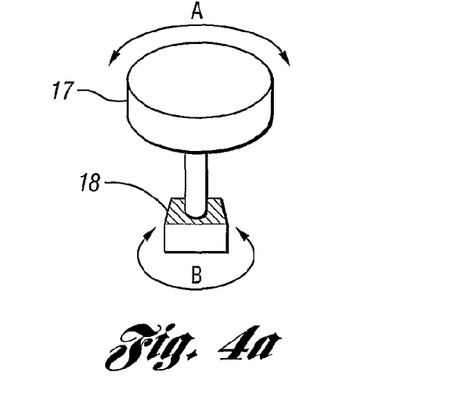
FIGS. 4A to 4D are sketches of various sensor arrangements.
Figure 4B:
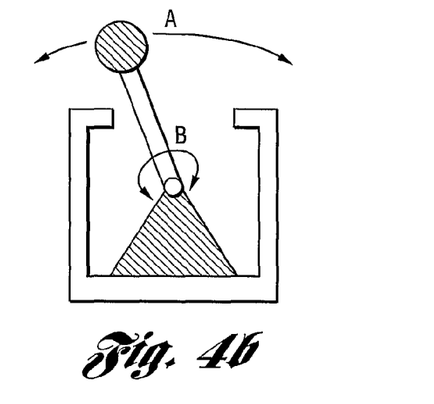
Figure 4C:
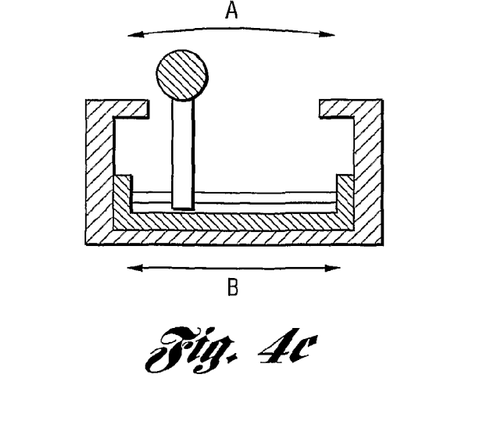
Figure 4D:
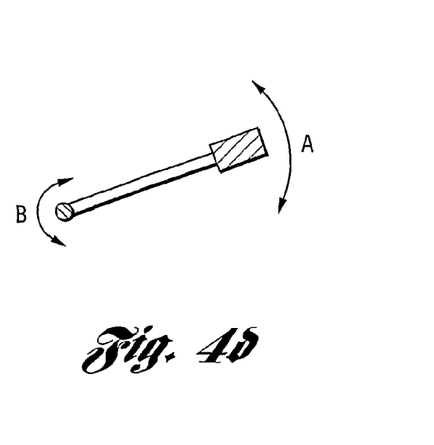

The selector system 12 comprises a selector, which in this example is a rotary selector 17 which can be grasped by the driver to select the operating mode and sensor means in the form of one or more position sensors 18. In this case, see FIG. 4A, the position sensor is an angular sensor 18, to detect the position of the rotary selector 17 (indicated as 'A' on FIG. 4A) as well as the direction and the magnitude of the motion of the selector and to transmit an input to the ETS 20 which transmits a command input to the TCU 16. The output from the sensor means 18 is an analogue signal in the form of a voltage Vps that is supplied to an analogue to digital converter 30 the digital output 'X' from which is supplied to a microprocessor forming part of the ETS 20.

It will be appreciated that, for other arrangements of selector, different selector arrangements will be required.

FIGS. 4A to 4D show respectively, a rotary selector 17 with angular sensor 18, a lever with pivot selector and angular sensor, a sliding selector with a linear sensor and a column selector with pivot angular sensor. In each case the arrow 'A' shows the part of the selector moved by the user and the arrow 'B' shows the motion detected by the sensor. This invention is equally applicable to any of these sensor arrangements.

Figure 5:
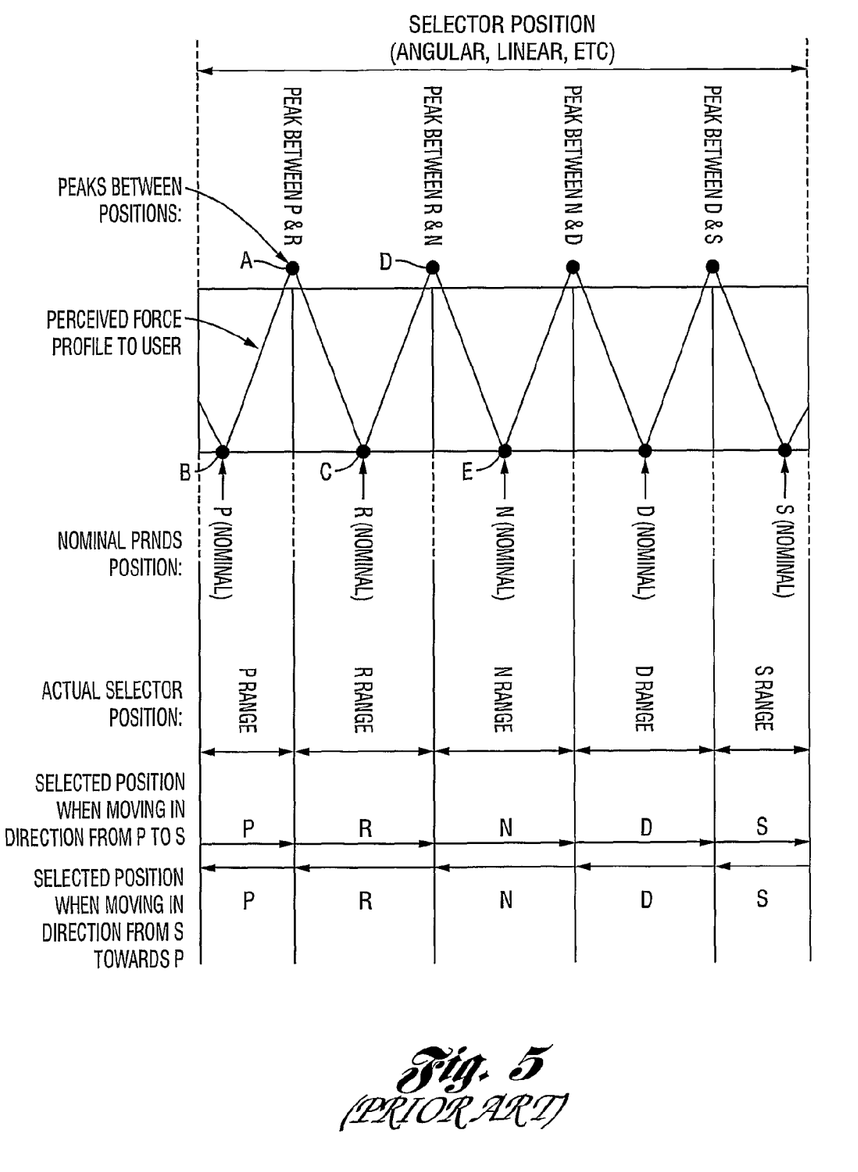
FIG. 5 is a graph illustrating the profile perceived by a driver when manipulating the selector in its different position and the sensor calibration used in a prior art selector system.
Figure 6:
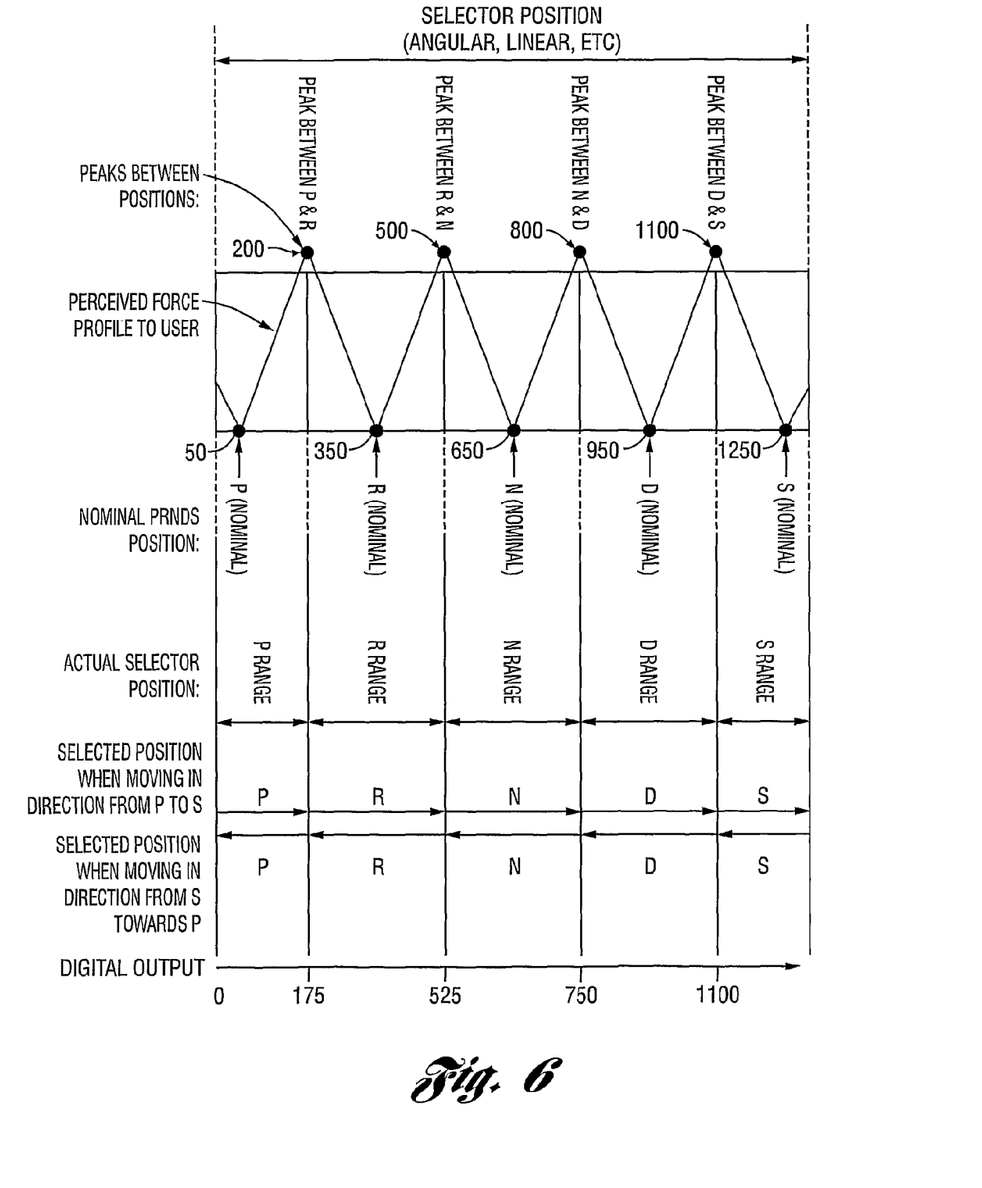
FIG. 6 is a graph similar to FIG. 5 but showing sensor calibration of a selector system according to a first embodiment of the invention.
Figure 7:
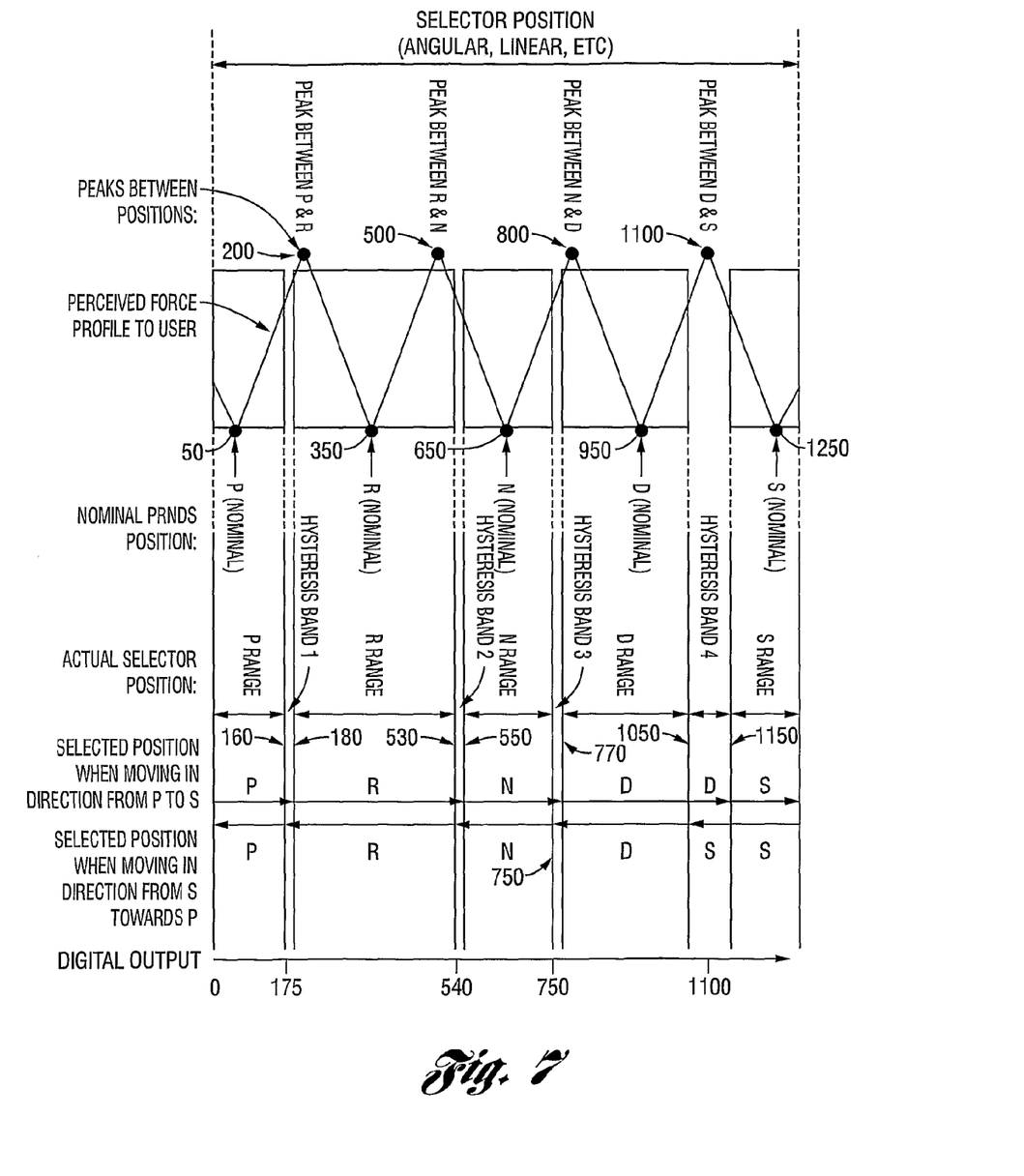
FIG. 7 is a graph illustrating the profile perceived by a driver when manipulating the selector in its different position and the sensor calibration used in a second embodiment of the invention in which hysteresis is provided between each of the various selector positions.

The rotary selector 17 is associated with an arrangement of illuminated labels (P, R, N, D, S) 19 indicating the selected mode. The selector 17 further includes an indexing mechanism 24 for maintaining the immobilisation of the selector in its different positions respectively P, R, N and D but also enabling the driver to perceive the transition from one position to another as illustrated in FIGS. 5 to 7.

In one example, the indexing mechanism 24 comprises a detent plate which is provided on its periphery with notches over a sector and these can be engaged successively by a spring-loaded detent member or detent pin when the detent plate rotates as explained more fully in GB-A-2420833 for instance.

The selector system 12 further includes a locking device 26 controlled by the transmission control unit 16 via the ETS 20 for preventing movement of the selector 17 when the selector is in Park position and a brake pedal 15 has not been depressed. In one example, the locking device 26 (not shown in detail) is a solenoid actuator engageable with a slot arranged within the detent plate.

The TCU 16 is also connected to a driver display 23 forming part of an instrument pack 25 in order to indicate the currently engaged gear of the transmission 11.

The indexing mechanism 24 is conformed in such a way as to provide a peak and trough force feedback to the driver. That is to say, when the selector 17 is moved from one stable position to another the force increases until it reaches a peak and then reduces again to the next stable position.

When the indexing mechanism 24 becomes worn or dirty due to use there is a possibility that that the selector 17 can be left in an intermediate or peak force position.

In the case of a prior art system this has the risk that the selector 17 might be unintentionally moved from a non drive position, i.e. Park or Neutral to a drive position, i.e. Reverse or Drive by a subsequent vibration, shock or even unintentionally by a person and thus shifting the transmission into one of the driving positions. It will be appreciated that when in a non-drive position a driver may decide to leave the vehicle or could blip the throttle expecting no movement of the vehicle 1.

By way of example, and as shown in FIG. 5, if the selector 17 is left in the position 'A' then it can fall into either of the positions 'B' or 'C', if it falls to position 'B' then a safe result is achieved but if it falls to position 'C' an unsafe result is achieved because it has moved from a non-drive mode (park) into a drive mode (reverse). Similarly, if the selector 17 is left in the position 'D' then it can fall into either of the positions 'E' or 'C', if it falls to position 'E' then a safe result is achieved but if it falls to position 'C' an unsafe result is achieved because it has moved from a non-drive mode (neutral) into a drive mode (reverse). This is the problem which the invention set forth herein solves.

It will be appreciated by those skilled in the art that although the force feedback is shown in FIGS. 5 to 7 for ease of understanding as a sharp peaked zigzag force response with linear changes in between peaks and troughs, this need not be the case and the force may vary non-linearly between the peaks and troughs and the peaks and troughs may be curvilinear such as would be the case if the force varied in the way of a sinusoidal output.

Figure 8:
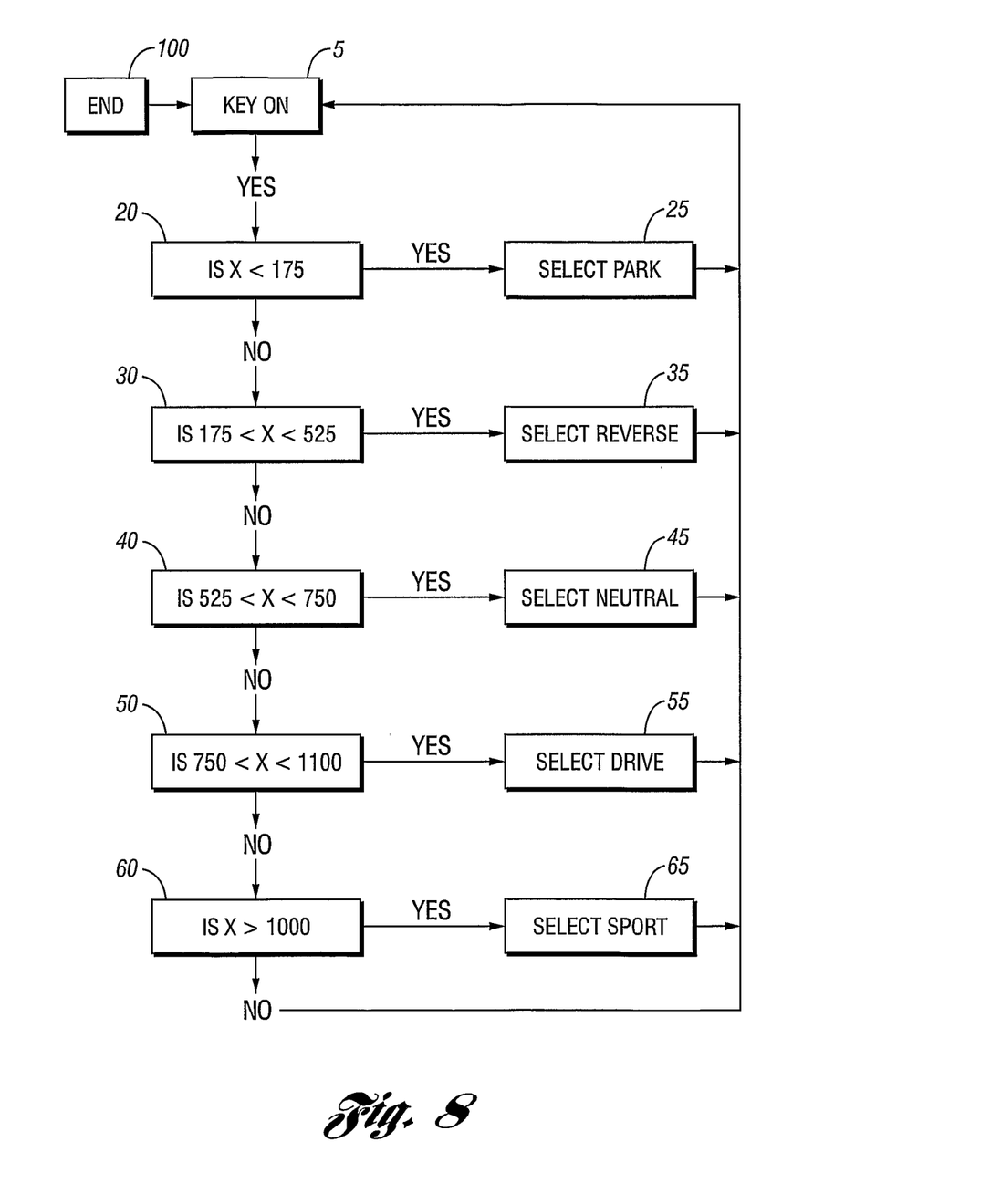
FIG. 8 is a flow chart showing a method according to the first embodiment of the invention.

Referring now to FIGS. 6 and 8 operation of a first embodiment of the invention will be described.

The apparatus is as previously described but in this case the ETS 20 is arranged to calibrate the output from the sensor 18 such that each of the peak force positions 200, 500, 800 and 1100 corresponds to a drive mode position and so even if the selector 17 is left at one of the peak positions and then falls to one of the trough or stable positions 50, 350, 650, 950 and 1250 a safe outcome is produced.

For example if the selector 17 is left at the peak force position 200 a drive mode namely reverse is already selected and so if the selector 17 falls back to stable position 50 a safe outcome results in that the transmission is transferred from a drive mode to a non-drive mode namely park. If the selector 17 falls forward to stable position 350 a safe outcome results in that the transmission remains in the reverse drive mode.

Similarly, if the selector 17 is left at the peak force position 500 a drive mode namely reverse is already selected and so if the selector 17 falls back to stable position 350 a safe outcome results in that the transmission remains in the reverse drive mode and, if the selector 17 falls forward to stable position 650, a safe outcome results in that the transmission is transferred from the reverse drive mode to a non-drive mode namely neutral.

To achieve this result the ETS 20 is programmed so as to divide the output range of the at least one sensor 18 into a number of bands having upper and lower limits corresponding to the various operating modes.

The digital output from the analogue converter 30 ranges in this example from 0 to 1300 for the full range of movement of the selector 17. The bands set up by the ETS are in this example 0 to 175 for park, 175 to 525 for reverse, 525 to 750 for neutral, 750 to 1100 for drive and 1100 to 1300 for sport. It will be appreciated that the selector 17 is operable to reversibly select the operating modes in the sequence park, reverse, neutral, drive and sport.

The bands are arranged such that, when the selector 17 is located at any one of the peak force feedback positions 200, 500, 800 and 1100 the magnitude of signal output from the at least one sensor 18 falls within one of the drive mode bands reverse, drive or sport. Note that 200, 500, 800 and 1100 are the digital magnitudes corresponding to the peak force positions.

Referring now to FIG. 8 there is shown the method used by the ETS 20 to determine the operating mode of the transmission 11.

Starting at block 5 a key-on state is determined, then at block 20 the ETS 20 determines whether the digital output 'X' from the analogue to digital converter 30 is less than 175, if it is, then park mode is selected as indicated by block 25 and the method returns via block 5 to block 20 unless the key-on test at 5 is failed, in which case, the method ends at 100. Note that in all cases, the required operating mode is selected by the ETS 20 commanding the TCU 16 to select the appropriate operating mode.

If at block 20 the digital output 'X' from the analogue to digital converter 30 is determine to be greater than 175 then the method advances to block 30 where it is determined whether the digital output 'X' from the analogue to digital converter 30 is greater than 175 but less than 525, if it is, then reverse mode is selected as indicated by block 35 and the method returns via block 5 to block 20 unless the key-on test at 5 is failed, in which case, the method ends at 100.

Note that the test at block 30 could alternatively be (Is X<525) because to reach block 30 it is known than X must be greater than 175.

If at block 30 the digital output 'X' from the analogue to digital converter 30 is determine to be greater than 525 then the method advances to block 40 where it is determined whether the digital output 'X' from the analogue to digital converter 30 is greater than 525 but less than 750, if it is, then neutral mode is selected as indicated by block 45 and the method returns via block 5 to block 20 unless the key-on test at 5 is failed, in which case, the method ends at 100.

Note that the test at block 40 could alternatively be (Is X<750) because to reach block 40 it is known than X must be greater than 525.

If at block 40 the digital output 'X' from the analogue to digital converter 30 is determine to be greater than 750 then the method advances to block 50 where it is determined whether the digital output 'X' from the analogue to digital converter 30 is greater than 750 but less than 1100, if it is, then drive mode is selected as indicated by block 55 and the method returns via block 5 to block 20 unless the key-on test at 5 is failed, in which case, the method ends at 100.

Note that the test at block 50 could alternatively be (Ts X<1100) because to reach block 50 it is known than X must be greater than 750.

If at block 50 the digital output 'X' from the analogue to digital converter 30 is determine to be greater than 1100 then the method advances to block 60 where it is determined whether the digital output 'X' from the analogue to digital converter 30 is greater than 1100, if it is, then sport mode is selected as indicated by block 65 and the method returns via block 5 to block 20 unless the key-on test at 5 is failed, in which case, the method ends at 100. If the test at block 60 is failed the method returns via block 5 to block 20.

It will be appreciated that the tests indicated in blocks 20 to 60 could be performed simultaneously whereas the alternative tests indicated above need to be performed in the sequence shown.

Therefore, if the selector 17 is located at the position 200, from block 30 reverse drive will be selected because 200 lies in the range 175 to 525.

If the selector 17 falls back to the stable position 50 the test at block 20 will be passed because 50 is less than 175 and the transmission 11 will be placed in a safe non-drive mode namely park and if the selector 17 falls forward from the peak position 200 to the stable position 350 the test at 30 will be passed because 350 lies in the range 175 to 525 and the transmission 11 will be remain in the same drive mode namely reverse. In either case a safe result is achieved.

Similarly, if the selector 17 is located at the position 500 from block 30 reverse drive will be selected because 500 lies in the range 175 to 525.

If the selector 17 falls back from 500 to the stable position 350 the test at block 30 will be passed because 350 lies in the range 175 to 525 and the transmission 11 will remain in the same drive mode namely reverse and if the selector 17 falls forward from the peak position 500 to the stable position 650 the test at 40 will be passed because 650 lies in the range 525 to 750 and the transmission 11 will be placed in a safe non-drive mode namely neutral. In either case a safe result is achieved.

Figure 9:
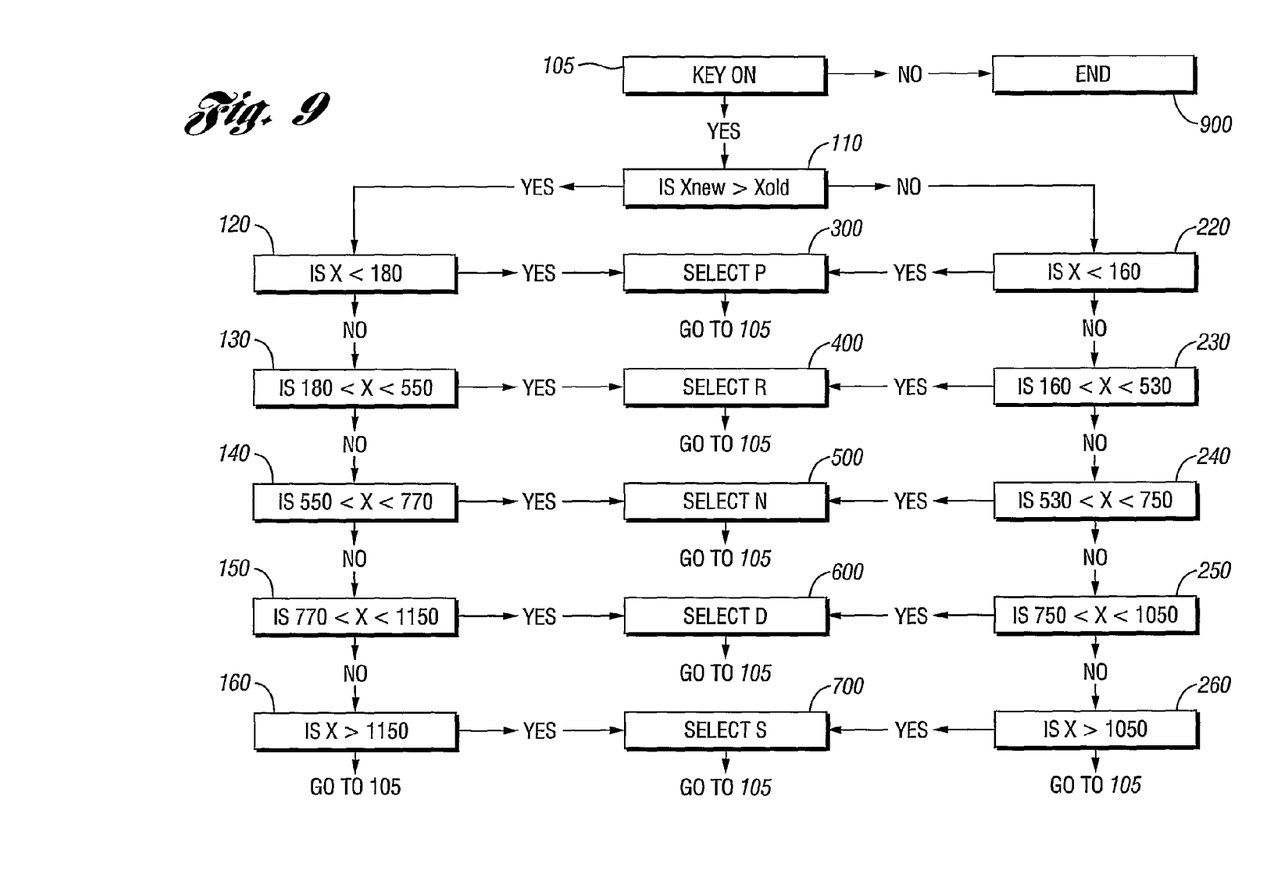
FIG. 9 is a flow chart showing a method according to the second embodiment of the invention.

Referring now to FIGS. 7 and 9 there is shown a second embodiment of the invention.

The apparatus is as previously described and the ETS 20 is arranged to calibrate the output from the sensor 18 such that each of the peak force positions 200, 500, 800 and 1100 corresponds to a drive mode position and so even if the selector 17 is left at one of the peak positions and then falls to one of the trough or stable positions 50, 350, 650, 950 and 1250 a safe outcome is produced.

As before, if the selector 17 is left at the peak force position 200, a drive mode namely reverse is already selected and so if the selector 17 falls back to stable position 50 a safe outcome results in that the transmission is transferred from a drive mode to a non-drive mode namely park. If the selector 17 falls forward to stable position 350 a safe outcome results in that the transmission remains in the reverse drive mode. Similarly, if the selector 17 is left at the peak force position 500 a drive mode namely reverse is already selected and so if the selector 17 falls back to stable position 350 a safe outcome results in that the transmission remains in the reverse drive mode and, if the selector 17 falls forward to stable position 650, a safe outcome results in that the transmission is transferred from the reverse drive mode to a non-drive mode namely neutral.

To achieve this result the ETS 20 is programmed so as to divide the output range of the at least one sensor 18 into a number of bands having upper and lower limits corresponding to the various operating modes but in the case of this embodiment the upper and lower limits of these bands are different depending upon the direction in which the selector 17 is moved.

As before, the digital output 'X' from the analogue converter 30 ranges from 0 to 1300 for the full range of movement of the selector 17.

The bands set up by the ETS 20 when the selector is being moved from park to reverse, reverse to neutral and neutral to drive are 0 to 180 for park, 180 to 550 for reverse, 550 to 770 for neutral, 770 to 1150 for drive and 1150 to 1300 for sport.

When the selector 17 is being moved from sport to drive, drive to neutral, neutral to reverse and reverse to park are 0 to 160 for park, 160 to 540 for reverse, 540 to 750 for neutral, 750 to 1050 for drive and 1050 to 1300 for sport.

It will be appreciated that the selector 17 is operable to reversibly select the operating modes in the sequence park, reverse, neutral, drive and sport.

The difference in these upper and lower limits is to reduce unstable operation of the transmission and reduce unnecessary operating mode changes.

These bands are arranged such that, when the selector 17 is located at any one of the peak force feedback positions 200, 500, 800 and 1100 the magnitude of signal output from the at least one sensor 18 falls within one of the drive mode bands reverse, drive or sport. Note that 200, 500, 800 and 1100 are the digital magnitudes corresponding to the peak force positions.

It will be noted that the upper and lower limits are higher when the selector 17 is moved from one of park to reverse, reverse to neutral and neutral to drive than they are when the selector 17 is moved from one of drive to neutral, neutral to reverse and reverse to park.

Referring now to FIG. 9 there is shown the method used by the ETS 20 to determine the operating mode of the transmission 11.

Starting at block 105 a key-on state is determined, the ETS 20 then at block 110 determines the direction of displacement of the selector 17 by comparing the current output Xnew from the analogue to digital converter 30 with a previous value Xold. If Xnew is greater than Xold the method advances to block 120 other wise it advances to block 220. That is to say, if the direction of movement is from park towards sport or any intermediate positions, the blocks 120 to 160 are performed but if the selector 17 is being moved from the sport position or any intermediate position towards the park position the blocks 220 to 260 are performed.

Considering first the passing of the test at step 110 then at block 120 the ETS 20 determines whether the digital output 'X' from the analogue to digital converter 30 is less than 180, if it is, then park mode is selected as indicated by block 300 and the method returns via block 105 to block 110 unless the key-on test at 105 is failed, in which case, the method ends at 900. Note that in all cases, the required operating mode is selected by the ETS 20 commanding the TCU 16 to select the appropriate operating mode.

If at block 120 the digital output 'X' from the analogue to digital converter 30 is determine to be greater than 180 then the method advances to block 130 where it is determined whether the digital output 'X' from the analogue to digital converter 30 is greater than 180 but less than 550, if it is, then reverse mode is selected as indicated by block 400 and the method returns via block 105 to block 110 unless the key-on test at 105 is failed, in which case, the method ends at 900.

Note that the test at block 130 could alternatively be (Is X<550) because to reach block 30 it is known than X must be greater than 180.

If at block 130 the digital output 'X' from the analogue to digital converter 30 is determine to be greater than 550 then the method advances to block 140 where it is determined whether the digital output 'X' from the analogue to digital converter 30 is greater than 550 but less than 770, if it is, then neutral mode is selected as indicated by block 500 and the method returns via block 105 to block 110 unless the key-on test at 105 is failed, in which case, the method ends at 900.

Note that the test at block 140 could alternatively be (Is X<770) because to reach block 140 it is known than X must be greater than 550.

If at block 140 the digital output 'X' from the analogue to digital converter 30 is determine to be greater than 770 then the method advances to block 150 where it is determined whether the digital output 'X' from the analogue to digital converter 30 is greater than 770 but less than 1150, if it is, then drive mode is selected as indicated by block 600 and the method returns via block 105 to block 110 unless the key-on test at 105 is failed, in which case, the method ends at 900.

Note that the test at block 150 could alternatively be (Is X<1150) because to reach block 150 it is known than X must be greater than 770.

If at block 150 the digital output 'X' from the analogue to digital converter 30 is determine to be greater than 1150 then the method advances to block 160 where it is determined whether the digital output 'X' from the analogue to digital converter 30 is greater than 1150, if it is, then sport mode is selected as indicated by block 700 and the method returns via block 105 to block 110 unless the key-on test at 105 is failed, in which case, the method ends at 900. If the test at block 160 is failed the method returns via block 105 to block 110 unless the key-on test at 105 is failed, in which case, the method ends at 900.

It will be appreciated that the tests indicated in blocks 120 to 160 could be performed simultaneously whereas the alternative tests indicated above need to be performed in the sequence shown.

Therefore as previously described, if the selector 17 is located at the position 200 from block 130 reverse drive will be selected because 200 lies in the range 180 to 550.

If the selector 17 falls back to the stable position 50 the test at block 120 will be passed because 50 is less than 180 and the transmission 11 will be placed in a safe non-drive mode namely park and if the selector 17 falls forward from the peak position 200 to the stable position 350 the test at 130 will be passed because 350 lies in the range 180 to 550 and the transmission 11 will remain in the same drive mode namely reverse. In either case a safe result is achieved.

Similarly, if the selector 17 is located at the position 500 from block 130 reverse drive will be selected because 500 lies in the range 180 to 550.

If the selector 17 falls back from 500 to the stable position 350 the test at block 130 will be passed because 350 lies in the range 180 to 550 and the transmission 11 will remain in the same drive mode namely reverse and if the selector 17 falls forward from the peak position 500 to the stable position 650 the test at 140 will be passed because 650 lies in the range 550 to 770 and the transmission 11 will be placed in a safe non-drive mode namely neutral. In either case a safe result is achieved.

Considering now the failing of the test at step 110 then at block 220 the ETS 20 determines whether the digital output 'X' from the analogue to digital converter 30 is less than 160, if it is, then park mode is selected as indicated by block 300 and the method returns via block 105 to block 110 unless the key-on test at 105 is failed, in which case, the method ends at 900.

If at block 220 the digital output 'X' from the analogue to digital converter 30 is determine to be greater than 160 then the method advances to block 230 where it is determined whether the digital output 'X' from the analogue to digital converter 30 is greater than 160 but less than 530, if it is, then reverse mode is selected as indicated by block 400 and the method returns via block 105 to block 110 unless the key-on test at 105 is failed, in which case, the method ends at 900.

Note that the test at block 230 could alternatively be (Is X<530) because to reach block 230 it is known than X must be greater than 160.

If at block 230 the digital output 'X' from the analogue to digital converter 30 is determine to be greater than 530 then the method advances to block 240 where it is determined whether the digital output 'X' from the analogue to digital converter 30 is greater than 530 but less than 750, if it is, then neutral mode is selected as indicated by block 500 and the method returns via block 105 to block 110 unless the key-on test at 105 is failed, in which case, the method ends at 900.

Note that the test at block 240 could alternatively be (Is X<770) because to reach block 240 it is known than X must be greater than 530.

If at block 240 the digital output 'X' from the analogue to digital converter 30 is determine to be greater than 750 then the method advances to block 250 where it is determined whether the digital output 'X' from the analogue to digital converter 30 is greater than 750 but less than 1050, if it is, then drive mode is selected as indicated by block 600 and the method returns via block 105 to block 110 unless the key-on test at 105 is failed, in which case, the method ends at 900.

Note that the test at block 250 could alternatively be (Is X<1050) because to reach block 150 it is known than X must be greater than 750.

If at block 250 the digital output 'X' from the analogue to digital converter 30 is determine to be greater than 1050 then the method advances to block 260 where it is determined whether the digital output 'X' from the analogue to digital converter 30 is greater than 1050, if it is, then sport mode is selected as indicated by block 700 and the method returns via block 105 to block 110 unless the key-on test at 105 is failed, in which case, the method ends at 900. If the test at block 260 is failed the method returns via block 105 to block 110 unless the key-on test at 105 is failed, in which case, the method ends at 900.

It will be appreciated that the tests indicated in blocks 220 to 260 could be performed simultaneously whereas the alternative tests indicated above need to be performed in the sequence shown.

Therefore as previously described, if the selector 17 is located at the position 200 from block 230 reverse drive will be selected because 200 lies in the range 160 to 530.

If the selector 17 falls back to the stable position 50 the test at block 220 will be passed because 50 is less than 160 and the transmission 11 will be placed in a safe non-drive mode namely park and if the selector 17 falls forward from the peak position 200 to the stable position 350 the test at 230 will be passed because 350 lies in the range 160 to 530 and the transmission 11 will be remain in the same drive mode namely reverse. In either case, a safe result is achieved.

Similarly, if the selector 17 is located at the position 500 from block 230 reverse drive will be selected because 500 lies in the range 160 to 530.

If the selector 17 falls back from 500 to the stable position 350 the test at block 230 will be passed because 350 lies in the range 160 to 530 and the transmission 11 will remain in the same drive mode namely reverse and if the selector 17 falls forward from the peak position 500 to the stable position 650 the test at 240 will be passed because 650 lies in the range 530 to 750 and the transmission 11 will be placed in a safe non-drive mode namely neutral. In either case a safe result is achieved.

Therefore in summary, a driver of a motor vehicle fitted with a control apparatus according to the invention cannot produce an unsafe condition in which the driver believes the transmission is in a safe non-drive mode but is in fact balanced between two modes and can fall into an unsafe drive mode which may result in unintended movement of the motor vehicle. In all cases either a drive mode will be maintained or the transmission will fall into a safe non-drive mode. It will be appreciated that a driver knowing that a drive mode is selected is unlikely to leave the motor vehicle or blip the throttle.

Although the invention has been described with reference to a rotary selector using only one sensor it will be appreciated that it is equally applicable to selector mechanisms having more than one sensor feedback or selectors of a linear type.

The invention claimed is:

1. A method for controlling a transmission of a motor vehicle having a number of operating modes including at least one non-drive mode and at least one drive mode and a multi-stable selector for operation by a driver of the vehicle to select a respective one of the operating modes of the transmission, the multi-stable selector including a mechanism providing a number of stable positions corresponding to the operating modes and a peak and trough force feedback to the driver so as to enable the driver to perceive the transition from one stable position to another and at least one sensor to sense the position of the selector and supply a signal to an electronic controller concerning the position, wherein the method comprises:
dividing the output range of the at least one sensor into a number of bands having upper and lower limits, the bands corresponding respectively to the number of operating modes;
arranging the bands such that, when the selector is located at any one of the stable positions, the position of the selector represented by the signal output from the at least one sensor falls within a respective one of the bands; and
adjusting the upper and lower limits of each band in dependence on the direction of movement of the selector.

2. A method as claimed in claim 1 wherein the transmission has two non-drive modes in the form of a park mode and a neutral mode and two drive modes in the form of a reverse mode and a forward mode.

3. A method as claimed in claim 2 wherein the multi-stable selector is operable to reversibly select the operating modes in the sequence park, reverse, neutral and drive.

4. A method as claimed in claim 2 wherein the transmission further comprises a third drive mode in the form of a sport mode.

5. A method as claimed in claim 4 wherein the multi-stable selector is operable to reversibly select the operating modes in the sequence park, reverse, neutral, drive and sport.

6. A method as claimed in claim 1 wherein the electronic controller comprises an electronic transmission selector operably connected to a transmission control unit, the electronic transmission selector being arranged to receive the signal from the at least one sensor and command the transmission control unit to select a desired operating mode.

7. A method as claimed in claim 1 wherein the upper and lower limits of each band are higher when the selector is moved in one direction than they are when the selector is moved in an opposite direction.

8. A method as claimed in claim 7 wherein the upper and lower limits are higher when the selector is moved from one of park to reverse, reverse to neutral and neutral to drive than they are when the selector is moved from one of drive to neutral, neutral to reverse and reverse to park.

9. A method as claimed in claim 7 wherein the upper and lower limits are higher when the selector is moved from one of park to reverse, reverse to neutral, neutral to drive and drive to sport than they are when the selector is moved from one of sport to drive, drive to neutral, neutral to reverse and reverse to park.

10. A method as claimed in claim 1, wherein a magnitude of the signal corresponds to a specific position of the selector.

11. A method for controlling a transmission of a motor vehicle having a number of operating modes including at least one non-drive mode and at least one drive mode and a multi-stable selector for operation by a driver of the vehicle to select a respective one of the operating modes of the transmission, the multi-stable selector including a mechanism providing a number of stable positions corresponding to the operating modes and a peak and trough force feedback to the driver so as to enable the driver to perceive the transition from one stable position to another and at least one sensor to sense the position of the selector and supply a signal to an electronic controller concerning the position, wherein the method comprises:
dividing the range of possible positions of the selector into a number of bands having upper and lower limits, the bands corresponding respectively to the number of operating modes;
arranging the bands such that, when the selector is located at any one of the stable positions, the position of the selector represented by the signal output from the at least one sensor falls within a respective one of the bands; and
adjusting the upper and lower limits of each band in dependence on the direction of movement of the selector.

12. A method as claimed in claim 11 wherein the transmission has two non-drive modes in the form of a park mode and a neutral mode and two drive modes in the form of a reverse mode and a forward mode.

13. A method as claimed in claim 12 wherein the multi-stable selector is operable to reversibly select the operating modes in the sequence park, reverse, neutral and drive.

14. A method as claimed in claim 12 wherein the transmission further comprises a third drive mode in the form of a sport mode.

15. A method as claimed in claim 14 wherein the multi-stable selector is operable to reversibly select the operating modes in the sequence park, reverse, neutral, drive and sport.

16. A method as claimed in claim 12 wherein the upper and lower limits are higher when the selector is moved from one of park to reverse, reverse to neutral and neutral to drive than they are when the selector is moved from one of drive to neutral, neutral to reverse and reverse to park.

17. A method as claimed in claim 11 wherein the upper and lower limits of each band are higher when the selector is moved in one direction than they are when the selector is moved in an opposite direction.

18. An apparatus for controlling a motor vehicle transmission with a number of operating modes including at least one non-drive mode and at least one drive mode, the apparatus comprising:

a multi-stable rotary selector for operation by a driver to select a respective one of the operating mode, wherein the multi-stable rotary selector includes a mechanism configured to provide a number of stable positions corresponding to the number of operating modes with each stable position representing a specific operating mode, the mechanism further configured to provide a peak and trough force feedback so as to enable the perception of a transition from one stable position to another stable position;

at least one sensor for sensing the position of the selector in a range of possible positions and configured to generate a signal concerning the position, the sensor being configured to generate the signal across the full range of movement of the selector such that a magnitude of the signal is representative of the angular position of the selector;

an electronic controller configured to receive the signal from the at least one sensor and select one of the number of operating modes based upon the received signal, the electronic controller further configured to divide the output range of the at least one sensor into a number of bands having upper and lower limits, the bands corresponding respectively to the number of operating modes, and to arrange the bands such that, when the selector is located at any one of the stable positions, the magnitude of the signal output from the at least one sensor falls within a respective one of the bands.

19. The apparatus as claimed in claim 18 wherein the electronic controller is configured to store a value of the magnitude of the signal output from the at least one sensor and to determine a direction of rotation of the rotary selector in dependence on a comparison between a current magnitude of the signal output from the at least one sensor and the previously stored value.

* * * * *